United States Patent
Chen et al.

(10) Patent No.: US 12,240,522 B2
(45) Date of Patent: Mar. 4, 2025

(54) REAL-TIME PATH PLANNING METHOD FOR INTELLIGENT DRIVING TAKING INTO ACCOUNT DYNAMIC PROPERTIES OF HIGH-PRECISION VEHICLES

(71) Applicant: Tongji University, Shanghai (CN)

(72) Inventors: Hong Chen, Shanghai (CN); Lin Zhang, Shanghai (CN); Rongjie Yu, Shanghai (CN); Qiang Meng, Shanghai (CN); Jinlong Hong, Shanghai (CN)

(73) Assignee: Tongji University, Shanghai (CN)

( * ) Notice: Subject to any disclaimer, the term of this patent is extended or adjusted under 35 U.S.C. 154(b) by 0 days.

(21) Appl. No.: 18/380,161

(22) Filed: Oct. 14, 2023

(65) Prior Publication Data
US 2024/0336302 A1    Oct. 10, 2024

(51) Int. Cl.
*B62D 15/02*    (2006.01)
*B60W 40/105*   (2012.01)

(52) U.S. Cl.
CPC ......... *B62D 15/029* (2013.01); *B60W 40/105* (2013.01); *B60W 2510/20* (2013.01); *B60W 2554/4041* (2020.02)

(58) Field of Classification Search
CPC .............. B62D 15/029; B60W 40/105; B60W 2554/4041; B60W 2510/20
USPC ........................................................ 701/41
See application file for complete search history.

(56) References Cited

U.S. PATENT DOCUMENTS

| | | | | |
|---|---|---|---|---|
| 4,692,765 A | * | 9/1987 | Politis ................ | G01S 13/9019 701/507 |
| 10,102,332 B1 | * | 10/2018 | Arechiga ............... | G06F 30/17 |
| 11,377,820 B2 | * | 7/2022 | Kean .................... | G05D 1/0217 |
| 11,619,953 B2 | * | 4/2023 | Rozenberg ........... | G08G 5/0039 701/8 |
| 11,796,673 B2 | * | 10/2023 | Beer .................... | G08G 5/0078 |
| 11,822,345 B2 | * | 11/2023 | Matei .................. | G05B 13/048 |
| 2014/0058657 A1 | * | 2/2014 | Mathews ............. | G05D 1/0212 701/400 |
| 2016/0153791 A1 | * | 6/2016 | Deittert ................ | G06Q 10/047 701/25 |
| 2017/0341236 A1 | * | 11/2017 | Patrick ................ | B25J 13/081 |
| 2018/0017971 A1 | * | 1/2018 | Di Cairano ........... | B60W 30/02 |

(Continued)

FOREIGN PATENT DOCUMENTS

| | | | | | |
|---|---|---|---|---|---|
| CN | 105526942 B | * | 3/2019 | .......... | G05D 1/0214 |
| CN | 109669459 B | * | 5/2022 | .......... | G05D 1/0214 |
| CN | 116774568 A | * | 9/2023 | .......... | G05D 1/0214 |

*Primary Examiner* — Richard A Goldman
(74) *Attorney, Agent, or Firm* — Jose Cherson Weissbrot

(57) ABSTRACT

The present invention provides a real-time path planning method taking into account dynamic properties of vehicles; the method includes a calculation without connecting to internet of a reachable set and an online path planning; in the calculation without connecting to internet of the reachable set, all vehicle safety states are traversed by means of the vehicle model and the wheel model, thereby predicting the position set capable of being reached by the vehicle at a next moment; in the online path planning, by means of calculating the position set capable of being reached by the vehicle at the next moment with connecting to internet, non-linear dynamic constraints are provided for the exploration of the artificial potential field method, achieving the purpose of real-time planning while taking into account dynamic properties of the vehicles.

7 Claims, 2 Drawing Sheets

(56) References Cited

U.S. PATENT DOCUMENTS

| | | | |
|---|---|---|---|
| 2019/0248411 A1* | 8/2019 | Peng | G06N 3/084 |
| 2019/0391580 A1* | 12/2019 | Di Cairano | G06N 5/022 |
| 2020/0039543 A1* | 2/2020 | Fan | B61L 27/16 |
| 2020/0142405 A1* | 5/2020 | Havens | B62D 15/025 |
| 2020/0180633 A1* | 6/2020 | Wu | B60W 30/18163 |
| 2020/0208983 A1* | 7/2020 | Wang | G01C 21/3461 |
| 2020/0216085 A1* | 7/2020 | Bobier-Tiu | B60W 40/08 |
| 2021/0114606 A1* | 4/2021 | Alvarez | G06N 3/047 |
| 2021/0262808 A1* | 8/2021 | Wang | G08G 1/166 |
| 2021/0370510 A1* | 12/2021 | Mao | B25J 13/086 |
| 2021/0403182 A1* | 12/2021 | Weiss | B64G 3/00 |
| 2022/0108621 A1* | 4/2022 | Li | B64C 39/024 |
| 2023/0074573 A1* | 3/2023 | Gupta | B60W 40/105 |
| 2023/0093546 A1* | 3/2023 | Guo | H04W 4/40 |
| | | | 701/117 |
| 2023/0303120 A1* | 9/2023 | Xiu | G05D 1/02 |
| | | | 701/301 |
| 2023/0351704 A1* | 11/2023 | McLachlan | G06V 20/20 |

* cited by examiner

REAL-TIME PATH PLANNING METHOD FOR INTELLIGENT DRIVING TAKING INTO ACCOUNT DYNAMIC PROPERTIES OF HIGH-PRECISION VEHICLES

TECHNICAL FIELD

This invention generally relates to the technical field of path planning for intelligent driving, and more particularly, to a real-time path planning method for intelligent driving taking into account dynamic properties of high-precision vehicles.

BACKGROUND

Along with the social progress, intelligent-driving vehicles have become popular. Driving in extreme weather conditions such as ice and snow environments has become a severe challenge. Therefore, the planning for an executable path while taking into account dynamic properties of the high-precision vehicles ensures the safe driving of intelligent-driving vehicles under the extreme working conditions.

For the real-time planning, the conventional methods include an artificial potential field method and a geometric corridor method. Both of the two methods are barrier functions in a constructed scene, and the path is planned in a direction with the minimum barrier function. Because the barrier function is fixed and the planning direction of each step is determined, the calculation amount is lowered. In addition, in a random search mode, the number of exploration times is reduced, wherein the conventional method is a random path sign graphical method. Due to the random exploration process, the calculation amount compared to that of a global exploration process is significantly reduced. Although the aforesaid method achieves high real-time performance and is extensively used, the stable boundary of a vehicle is not considered. In working conditions such as an ice and snow environment, the dynamic properties of the vehicle are obviously non-linear. Under such circumstances, traffic accidents may be easily caused due to the failure of following the planned path.

For the planning taking into account dynamic properties, due to the convenience of providing constraints for the environment, vehicle control and vehicle state, a path planning method based on model prediction control is widely adopted. Because the dynamic properties of a vehicle are obviously non-linear in working conditions such as an ice and snow environment, the problem relating to the fast solution of non-linear optimization cannot be solved. However, the path planning method based on model prediction control is used to solve an optimization problem, resulting in difficulty of planning an executable path in real time in a working condition that the dynamic properties of a vehicle is obviously non-linear. In another aspect, in a driving environment with high dynamic variation, the derivation of the objective function becomes more difficult due to the variation and growth of the number of barriers, leading to the high executability and low real-time performance of the planned path.

SUMMARY

The purpose of the present invention is to provide a real-time path planning method for intelligent driving taking into account dynamic properties of high-precision vehicles, thereby realizing the real-time path planning under extreme working conditions, improving the safety of intelligent driving and expanding the application range.

To achieve the above purpose, the present invention adopts the following technical solution: a real-time path planning method for intelligent driving taking into account dynamic properties of high-precision vehicles, comprising the steps of Step 1: taking into account the dynamic properties of a vehicle, and calculating a reachable set of the vehicle based on the vehicle state and the wheel lateral force without connecting to internet;

Step 2: constructing an artificial potential field, and obtaining an online path planning taking into account non-linear properties of the vehicle based on the artificial potential field and the reachable set of the vehicle.

In another embodiment of the present invention, step 1 further comprising the steps of Step 1.1: obtaining an initial state of the vehicle, and estimating the wheel lateral force of the vehicle offline based on a two-degree-of-freedom vehicle model and a non-linear wheel model without connecting to internet; wherein the initial state of the vehicle comprises a transverse vehicle speed, a longitudinal vehicle speed and a yaw velocity;

Step 1.2: determining an input amount according to the wheel lateral force of the vehicle, and predicting a vehicle state at a next moment based on a discretized three-degree-of-freedom vehicle model without connecting to internet;

Step 1.3: calculating a position of the vehicle at the next moment based on the initial state of the vehicle and the predicted vehicle state at the next moment;

Step 1.4: determining a range of feasible input variables according to the wheel lateral force estimated in steps 1.1 and a maximum value of the wheel lateral force of the vehicle, traversing values in the range of feasible input variables as the input amount, and repeating steps 1.2 and 1.3 to obtain a single vehicle reachable set in the initial state;

Step 1.5: determining a range of safe vehicle states according to a maximum value of the transverse vehicle speed, a maximum value of the longitudinal vehicle speed, a maximum value of the yaw velocity, and the initial state of the vehicle; traversing values in the range of the safe vehicle states as the initial state of the vehicle, repeating steps 1.1-1.4 to obtain the reachable set of the vehicle, and storing the reachable set of the vehicle in a database without connecting to internet.

In another embodiment of the present invention, step 2 further comprising the steps of Step 2.1: obtaining the initial state of the vehicle with connecting to internet, querying the reachable set of the vehicle, and taking the reachable set of the vehicle as a range of a end point of a path planned in a current step;

Step 2.2: constructing an artificial potential field distribution of a scene based on a driving environment;

Step 2.3: selecting a point with a minimum barrier coefficient obtained based on an artificial potential field method in the reachable set of the vehicle queried in step 2.1, and using the point as an end point of the path planned in the current step at the next moment;

Step 2.4: querying a vehicle state at the next moment corresponding to the reachable set of the vehicle according to the end point of the path planned in the current step at the next moment, and taking the vehicle state at the next moment as the initial vehicle state of a planned path in a next predicted sample time;

Step 2.5: repeating steps 2.1-2.4 until a valid duration of a required future path is equal to a sum of predicted sample times, and completing the online path planning.

In another embodiment of the present invention, the calculation formula for estimating a wheel lateral force of the vehicle based on the two-degree-of-freedom vehicle model and the non-linear wheel model without connecting to internet by using following calculation formulas:

$$\alpha_1 = \delta_f - \arctan\left(\frac{v_y + a\dot\varphi}{v_x}\right)$$

$$\alpha_2 = \arctan\left(\frac{-v_y + b\dot\varphi}{v_x}\right)$$

$$F_{yf} = \mu * m * g * b/(a+b) * \left(\frac{2}{1+e^{-35\alpha_1}} - 1\right)$$

$$F_{yr} = \mu * m * g * a/(a+b) * \left(\frac{2}{1+e^{-35\alpha_2}} - 1\right)$$

wherein a represents a front wheelbase distance of the vehicle, wherein b represents a rear wheelbase distance of the vehicle, wherein m represents a mass of the vehicle, wherein $p_x$ represents the transverse vehicle speed, wherein $v_y$ represents the longitudinal vehicle speed, wherein $\varphi$ represents the yaw velocity of the vehicle, wherein g represents a gravitational acceleration, wherein μ represents a ground adhesion coefficient, wherein $\delta_f$ represents a front wheel rotation angle in a current state, wherein $\alpha_1$ and $\alpha_2$ respectively represent front and rear wheel side deflection angles of the vehicle, and wherein $F_{yf}$ and $F_{yr}$ respectively represent front and rear wheel lateral forces of the vehicle.

In another embodiment of the present invention, a three-degree-of-freedom vehicle model is used to express the dynamic properties of the vehicle by using a whole state equation as follows:

$$\begin{cases} \dot{v}_x = v_y\dot\varphi + \frac{1}{m}F_{xf}\cos(\delta_f) - \frac{1}{m}F_{yf}\sin(\delta_f) + \frac{1}{m}F_{xr} \\ \dot{v}_y = -v_x\dot\varphi + \frac{1}{m}F_{xf}\sin(\delta_f) + \frac{1}{m}F_{yf}\cos(\delta_f) + \frac{1}{m}F_{yr} \\ \ddot\varphi = \frac{L_f}{I_z}(F_{xf}\sin(\delta_f) + F_{yf}\cos(\delta_f)) + \frac{L_r}{I_z}F_{yr} \end{cases}$$

wherein in the aforesaid whole state equation, $F_{yf}$ represents a lateral force of a front wheel, wherein $F_{yr}$ represents a lateral force of a rear wheel, wherein $F_{xf}$ represents a longitudinal force of the front wheel, wherein $F_{xr}$ represents a longitudinal force of the rear wheel, wherein $v_x$ represents the transverse vehicle speed, wherein $v_y$ represents the longitudinal vehicle speed, wherein $\dot\varphi$ represents the yaw velocity, wherein $\ddot\varphi$ represents a yaw angular acceleration, wherein m represents a mass of the vehicle, wherein t$\delta_f$ represents a front wheel rotation angle, wherein $L_f$ represents a distance from a mass center of the vehicle to a front axle, wherein $L_r$ represents a distance from the mass center of the vehicle to a rear axle, and wherein $I_z$ represents a rotational inertia of the vehicle.

In another embodiment of the present invention, the discretized three-degree-of-freedom vehicle model is obtained by discretizing the three-degree-of-freedom vehicle model using a third-order third-stage Runge-Kutta formula, the discretized three-degree-of-freedom vehicle model is used to predict the vehicle state at the next moment, wherein a input amount of the discretized three-degree-of-freedom vehicle model is defined as a input matrix u=[$F_{yf}$ $F_{yr}$ $F_{xf}$ $F_{xr}$ $\delta_f$] and a state matrix x=[$v_x$ $v_y$ $\varphi$], and a calculation formula of a recursive prediction process is as follows:

$$\begin{cases} k_1 = Tf(x, u) \\ k_2 = Tf\left(x + \frac{1}{2}k_1, u\right) \\ k_3 = Tf(x - k_1 + 2k_2, u) \\ x^* = x + \frac{1}{6}(k_1 + 4k_2 + k_3) \end{cases}$$

wherein T represents a predicted sample time, wherein f represents a replaced symbol of a differential equation of the three-degree-of-freedom vehicle model, wherein $k_1$, $k_2$ and $k_3$ respectively represent intermediate variables in a calculation process, and wherein x*=[$v_x^*v_y^*\varphi^*$] represents a predicted vehicle state matrix at the next moment.

In another embodiment of the present invention, a calculation formula for calculating the position of the vehicle at a next moment based on the initial state of the vehicle and the predicted vehicle state at the next moment is:

$$\begin{cases} \Delta X = \frac{1}{2}(v_x + v_x^*)T \\ \Delta Y = \frac{1}{2}(v_y + v_y^*)T \end{cases}$$

wherein ΔX and ΔY represent a range where the vehicle is capable of reaching relative to a current position of the vehicle at the next moment.

In another embodiment of the present invention, the reachable set of the vehicle includes discrete vehicle initial state data, vehicle wheel lateral force data, vehicle next moment state data and vehicle next moment position data.

In another embodiment of the present invention, according to a wheel force saturation condition of the vehicle, a driving range may be divided into three sections: a portion of a predicted wheel force at the next moment lower than 50% of a wheel force saturation value is defined as a normal driving section, a portion of the predicted wheel force at the next moment greater than 50% and lower than 75% of the wheel force saturation value is defined as an emergency driving section, and a portion of the predicted wheel force at the next moment greater than 75% of the wheel force saturation value is defined as a dangerous driving section.

In another embodiment of the present invention, calculation formulas of the wheel force at the next moment and the wheel force saturation value are:

$$F_f^* = \sqrt{(F_{xf}^2 + F_{yf}^{*2})}$$

$$F_{max} = \mu mg\frac{L_f}{L_f + L_r}$$

wherein $F_f^*$ represents the predicted wheel force at the next moment, wherein $F_{xf}$ represents a front wheel longitudinal force, wherein $F_{yf}^*$ represents a predicted front wheel lateral force at the next moment, wherein $F_{max}$ represents the wheel force saturation value, wherein μ represents a ground adhesion coefficient, wherein m represents a mass of the vehicle, wherein g represents a gravitational acceleration, wherein $L_f$ represents a distance from a mass center of the vehicle to a front axle, and wherein $L_r$ represents a distance from the mass center of the vehicle to a rear axle.

Compared with the prior art, the present invention has the following advantages: according to the present invention, all vehicle safety states are traversed by means of the vehicle model and the wheel model, thereby predicting the position set capable of being reached by the vehicle at a next moment; the reachable set of the vehicle is constructed without connecting to internet, and the non-linear properties of the vehicle are reserved as much as possible, so that the dynamic properties of vehicles are fully considered; the real-time vehicle path planning is performed by means of online path prediction, so that the online calculation amount is reduced, the calculation efficiency is improved, and the requirement of real-time path planning is met; thus, the safety of the intelligent-driving vehicles is ensured under extreme working conditions.

DETAILED DESCRIPTION

Detailed embodiments and drawings are combined hereinafter to further elaborate the technical solution of the present invention. These embodiments are implemented based on the technical solution of the present invention. Though a detailed implementation manner and a specific operation process are described, the scope of the present invention is not limited to the following embodiments.

Figure 1:
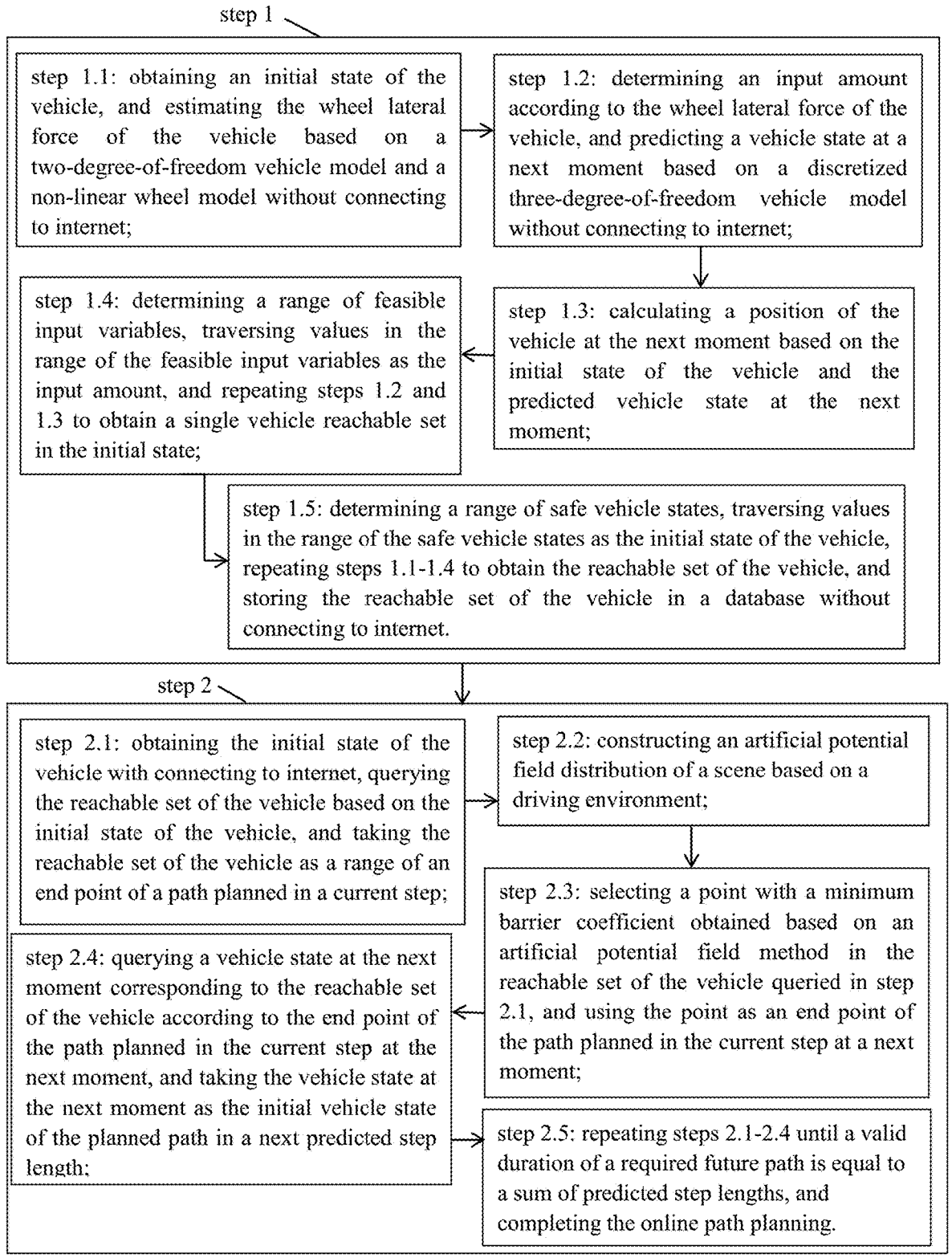
FIG. 1 is a flow chart illustrating the method of the present invention.
Figure 2:
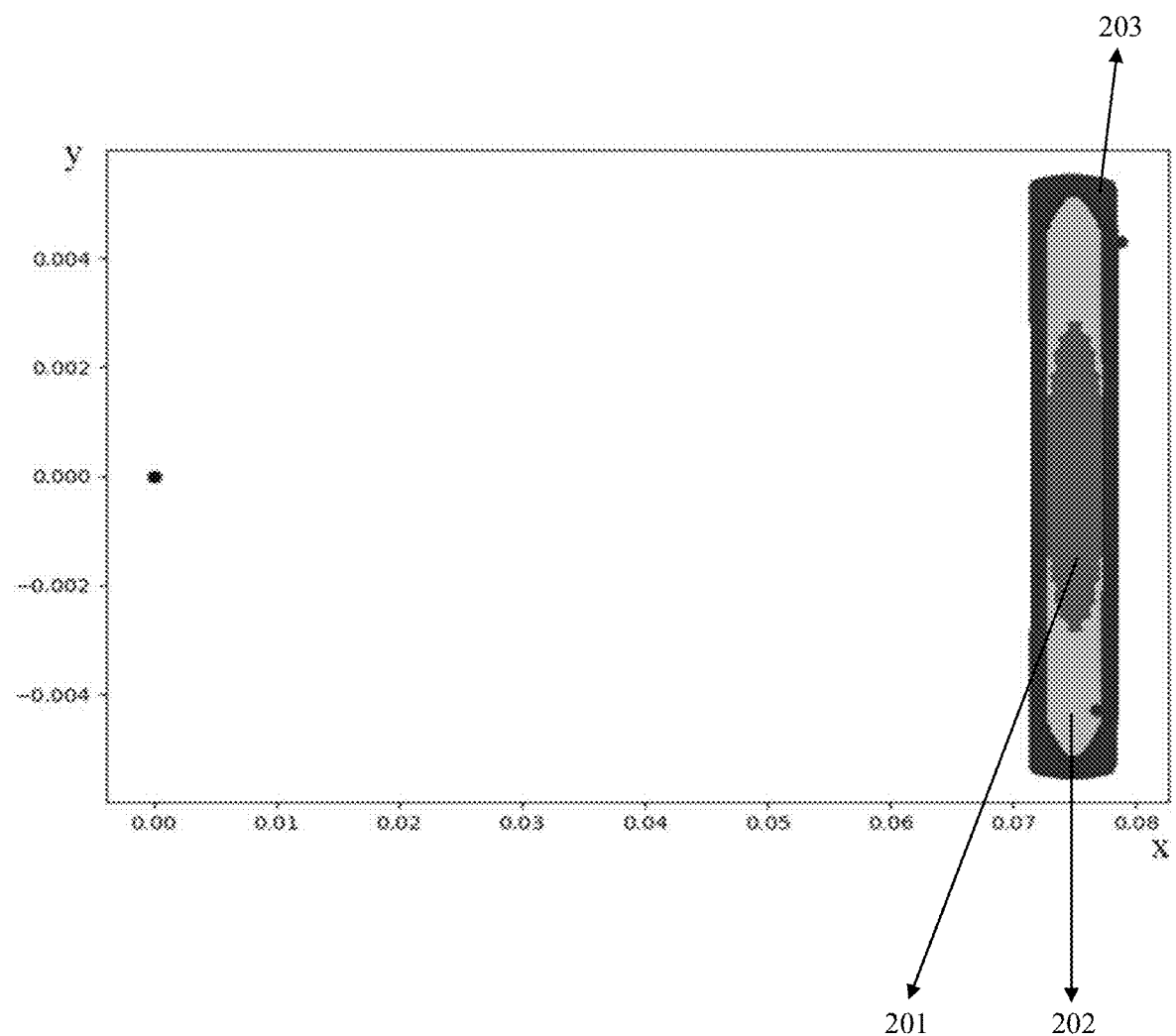
FIG. 2 is a schematic diagram illustrating the reachable set of the vehicle at a next moment predicted in the embodiment of the present invention.

The dynamic properties of vehicles are obviously non-linear in working conditions such as an ice and snow environment, and therefore, the planning for an executable path while taking into account dynamic properties of the vehicles is a guarantee for the safe driving of intelligent vehicles under the extreme operating conditions. The present invention provides a real-time path planning method for intelligent driving taking into account dynamic properties of vehicles. The method of the present invention comprises a calculation of a reachable set of the vehicle without connecting to internet and an online path planning. As shown in FIG. 1, the method of the present invention comprising the steps of Step 1: taking into account the dynamic properties of a vehicle, and calculating a reachable set of the vehicle based on the vehicle state and the wheel lateral force without connecting to internet;

In step 1, specifically, taking into account the implementation mode of the non-linear dynamic constraint of the vehicle, and converting a calculation with connecting to internet into a calculation without connecting to internet and query with connecting to internet to reduce the calculation amount in the online planning process, comprising the steps of Step 1.1: obtaining an initial state of the vehicle, and estimating the wheel lateral force of the vehicle offline based on a two-degree-of-freedom vehicle model and a non-linear wheel model without connecting to internet; wherein the initial state of the vehicle comprises a transverse vehicle speed, a longitudinal vehicle speed and a yaw velocity;

wherein in this embodiment, specifically, a calculation formula for estimating the wheel lateral force is the following:

$$\alpha_1 = \delta_f - \arctan\left(\frac{v_y + a\dot{\varphi}}{v_x}\right)$$

$$\alpha_2 = \arctan\left(\frac{-v_y + b\dot{\varphi}}{v_x}\right)$$

$$F_{yf} = \mu * m * g * b/(a+b) * \left(\frac{2}{1+e^{-35\alpha_1}} - 1\right)$$

$$F_{yr} = \mu * m * g * a/(a+b) * \left(\frac{2}{1+e^{-35\alpha_2}} - 1\right)$$

wherein a and b respectively represent the front and rear wheelbase distances of the vehicle, wherein m represents the mass of the vehicle, wherein $v_x$ represents the transverse vehicle speed, wherein $v_y$ represents the longitudinal vehicle speed, wherein $\varphi$ represents the yaw velocity of the vehicle, wherein g represents a gravitational acceleration, wherein $\mu$ represents a ground adhesion coefficient, wherein $\delta_f$ represents a front wheel rotation angle in the current state, wherein $\alpha_1$ and $\alpha_2$ respectively represent front and rear wheel side deflection angles of the current vehicle, and wherein $F_{yf}$ and $F_{yr}$ respectively represent the front and rear wheel lateral forces of the vehicle;

In this step, more complex or simpler models may be selected according to the precision requirements for expressing the nonlinearity of vehicle dynamics, which are not limited to the method proposed in this embodiment;

Step 1.2: determining an input amount according to the wheel lateral force of the vehicle, and predicting a vehicle state at a next moment based on a discretized three-degree-of-freedom vehicle model without connecting to internet, wherein in this embodiment, a three-degree-of-freedom vehicle model is used to express the dynamic properties of the vehicle by using a whole state equation as follows:

$$\begin{cases} \dot{v}_x = v_y\dot{\varphi} + \frac{1}{m}F_{xf}\cos(\delta_f) - \frac{1}{m}F_{yf}\sin(\delta_f) + \frac{1}{m}F_{xr} \\ \dot{v}_y = -v_x\dot{\varphi} + \frac{1}{m}F_{xf}\sin(\delta_f) + \frac{1}{m}F_{yf}\cos(\delta_f) + \frac{1}{m}F_{yr} \\ \ddot{\varphi} = \frac{L_f}{I_z}(F_{xf}\sin(\delta_f) + F_{yf}\cos(\delta_f)) + \frac{L_r}{I_z}F_{yr} \end{cases}$$

wherein in the aforesaid whole state equation, $F_{yf}$ represents a lateral force of a front wheel, wherein $F_{yr}$ represents a lateral force of a rear wheel, wherein $F_{xf}$ represents a longitudinal force of the front wheel, wherein $F_{xr}$ represents a longitudinal force of the rear wheel, wherein $v_x$ represents the transverse vehicle speed, wherein $v_y$ represents the longitudinal vehicle speed, wherein $\dot{\varphi}$ represents the yaw velocity, wherein $\ddot{\varphi}$ represents a yaw angular acceleration, wherein m represents a mass of the vehicle, wherein $\delta_f$ represents a front wheel rotation angle, wherein $L_f$ represents a distance from a mass center of the vehicle to a front axle, wherein $L_r$ represents a distance from the mass center of the vehicle to a rear axle, and wherein $I_z$ represents a rotational inertia of the vehicle;

In this embodiment, the discretized three-degree-of-freedom vehicle model is obtained by discretizing the three-degree-of-freedom vehicle model using a third-order third-stage Runge-Kutta formula, the discretized three-degree-of-freedom vehicle model is used to predict the vehicle state at the next moment, wherein a input amount of the discretized three-degree-of-freedom vehicle model is defined as a input matrix $u=[F_{yf} F_{yr} F_{xf} F_{xr} \delta_f]$ and a state matrix $x=[v_x v_y \dot{\varphi}]$, and the calculation formula of a recursive prediction process is as follows:

$$\begin{cases} k_1 = Tf(x, u) \\ k_2 = Tf\left(x + \frac{1}{2}k_1, u\right) \\ k_3 = Tf(x - k_1 + 2k_2, u) \\ x^* = x + \frac{1}{6}(k_1 + 4k_2 + k_3) \end{cases}$$

wherein T represents a predicted sample time, wherein f represents a replaced symbol of a differential equation of the three-degree-of-freedom vehicle model, wherein $k_1$, $k_2$ and $k_3$ respectively represent the intermediate variables in the calculation process, and wherein $x^*=[v_x^* v_y^* \dot{\varphi}^*]$ represents a predicted vehicle state matrix at the next moment;

Step 1.3: calculating a position of the vehicle at the next moment based on the initial state of the vehicle and the predicted vehicle state at the next moment by a calculation formula as follows:

$$\begin{cases} \Delta X = \frac{1}{2}(v_x + v_x^*)T \\ \Delta Y = \frac{1}{2}(v_y + v_y^*)T \end{cases}$$

wherein $\Delta X$ and $\Delta Y$ represent a range where the vehicle is capable of reaching relative to a current position of the vehicle at the next moment;

Step 1.4: determining a range of feasible input variables according to the wheel lateral force estimated in steps 1.1 and a maximum value of the wheel lateral force of the vehicle, traversing values in the range of feasible input variables as the input amount, and repeating steps 1.2 and 1.3 to obtain a single vehicle reachable set in the initial state;

Step 1.5: determining a range of safe vehicle states according to a maximum value of the transverse vehicle speed, a maximum value of the longitudinal vehicle speed, a maximum value of the yaw velocity, and the initial state of the vehicle; traversing values in the range of the safe vehicle states as the initial state of the vehicle, repeating steps 1.1-1.4 to obtain the reachable set of the vehicle, and storing the reachable set of the vehicle in a database without connecting to internet;

The reachable set of the vehicle is a dataset, and it includes discrete vehicle initial state data, vehicle wheel lateral force data, vehicle next moment state data and vehicle next moment position data; therefore, the calculation of the vehicle reachable set of the vehicle comprises the following three steps:

1) Estimating an initial wheel force of the vehicle: estimating the lateral force of the front wheel $F_{yf}$ and the lateral force of the rear wheel $F_{yr}$ in the current state according to the initial state of the vehicle, namely, $x=[v_x v_y \dot{\varphi}]$; it is worth mentioning that, to cover the safe driving section of the vehicle, a reasonable initial state needs to be traversed, wherein the maximum value of $v_x$ is 120, and the traversal sample time is 5, wherein the maximum value of $v_y$ is 1, and the traversal sample time is 0.1, and wherein the maximum value of $\dot{\varphi}$ is 3, and the traversal sample time is 0.1;

2) Estimating the vehicle state at a next moment $x^*= [v_x^* v_y^* \dot{\varphi}^*]$ by means of a given input state $u=[F_{yf} F_{yr} F_{xf} F_{xr} \delta_f]$ according to the vehicle state prediction; it should be noted that, the reachable set of the vehicle is a dataset, and a reasonable input state needs to be traversed, wherein $F_{yf}$ and $F_{yr}$ are calculated and obtained in step 1), wherein $F_{xf}$ and $F_{xr}$ depend on the acceleration performance of the vehicle, the maximum value and the minimum value are respectively 1000 and −1000, and the traversal sample time is 10, wherein $\delta_f$ depends on the design of the steering mechanism of the vehicle, the maximum value and the minimum value are respectively 20 and −20, and the traversal sample time is 1;

3) Predicting a reachable set of the vehicle: calculating the range of position where the vehicle is capable of reaching at the next moment according to the vehicle state obtained in step 2);

Taking the input state $x=[0\ 0\ 0]$ as an example, the schematic diagram of the obtained vehicle reachable set is shown in FIG. 2. Please note that the X axis in FIG. 2 defines the "longitudinal transport distance" and the Y axis in FIG. 2 defines the "lateral transport distance". As illustrated in FIG. 2, a driving range may be divided into three sections in accordance to the wheel force saturation condition of the vehicle when reaching the current position: a portion of a predicted wheel force at the next moment lower than 50% of a wheel force saturation value is defined as a normal driving section (201) (corresponding to the dark gray area in the very center of FIG. 2), a portion of the predicted wheel force at the next moment greater than 50% and lower than 75% of the wheel force saturation value is defined as an emergency driving section (202) (corresponding to the light gray area in the middle of FIG. 2), and a portion of the predicted wheel force at the next moment greater than 75% of the wheel force saturation value is defined as a dangerous driving section (203) (corresponding to the outermost black area in FIG. 2), wherein calculation formulas of the wheel force at the next moment and the wheel force saturation value are:

$$F_f^* = \sqrt{(F_{xf}^2 + F_{yf}^{*2})}$$

$$F_{max} = \mu m g \frac{L_f}{L_f + L_r}$$

wherein $F_f^*$ represents the predicted wheel force at the next moment, wherein $F_{xf}$ represents a front wheel longitudinal force, wherein $F_{yf}^*$ represents a predicted front wheel lateral force at the next moment, wherein $F_{max}$ represents the wheel force saturation value, wherein $\mu$ represents a ground adhesion coefficient, wherein m represents a mass of the vehicle, wherein g represents a gravitational acceleration, wherein $L_f$ represents a distance from a mass center of the vehicle to a front axle, and wherein $L_f$ represents a distance from the mass center of the vehicle to a rear axle;

The accuracy of the reachable set of the vehicle is related to the capability of the computing platform, and the model precision may be improved or reduced according to the actual situation;

Step 2: constructing an artificial potential field, and obtaining an online path planning taking into account non-linear properties of the vehicle based on the artificial potential field and the reachable set of the vehicle;

Step 2 is performed in real time, and specifically, quickly planning the path while taking into account the non-linear properties of the vehicle based on the artificial potential field method and the reachable set of the vehicle calculated and stored in step 1 comprising the steps of:

Step 2.1: obtaining the initial state of the vehicle with connecting to internet, querying the reachable set of the vehicle, and taking the reachable set of the vehicle as a range of a end point of a path planned in a current step;

Step 2.1 ensures that the planned path in the next step conforms to the non-linear properties of the vehicle, thereby ensuring the executability of the path;

Step 2.2: constructing an artificial potential field distribution of a scene based on a driving environment;

Step 2.3: selecting a point with a minimum barrier coefficient obtained based on an artificial potential field method in the reachable set of the vehicle queried in step 2.1, and using the point as an end point of the path planned in the current step at the next moment;

Step 2.4: querying a vehicle state at the next moment corresponding to the reachable set of the vehicle according to the end point of the path planned in the current step at the next moment, and taking the vehicle state at the next moment as the initial vehicle state of a planned path in a next predicted sample time;

Step 2.5: repeating steps 2.1-2.4 until a valid duration of a required future path is equal to a sum of predicted sample times, and completing the online path planning; in this embodiment, the valid duration of the required future path is 3 seconds, and the predicted sample time is 0.1 second.

The preferred embodiments of the present invention are described in detail above. It should be understood that modifications and variations may be made by those skilled in the art according to the concept of the present invention without paying creative labor. Therefore, the technical solutions obtained by those skilled in the art according to the concept of the present invention by means of logical analysis, reasoning or limited experiments on the basis of the prior art should fall into the scope defined by the claims of the present invention.

What is claimed is:

1. A real-time path planning method taking into account dynamic properties of vehicles, comprising the steps of:
   step 1: taking into account the dynamic properties of a vehicle, and calculating a reachable set of the vehicle based on a vehicle state and a wheel lateral force without connecting to internet;
   step 2: constructing an artificial potential field, and obtaining a path planning taking into account non-linear properties of the vehicle based on the artificial potential field and the reachable set of the vehicle;
   wherein step 1 further comprises the steps of:
   step 1.1: obtaining an initial state of the vehicle, and estimating the wheel lateral force of the vehicle based on a two-degree-of-freedom vehicle model and a non-linear wheel model without connecting to internet; wherein the initial state of the vehicle comprises an initial value of transverse vehicle speed, a longitudinal vehicle speed and a yaw velocity;
   step 1.2: determining an input amount according to the wheel lateral force of the vehicle, and predicting a vehicle state at a next moment based on a discretized three-degree-of-freedom vehicle model without connecting to internet;
   step 1.3: calculating another vehicle state at another moment, subsequent to the next moment, based on the initial state of the vehicle and the predicted vehicle state at the next moment;
   step 1.4: determining a range of feasible input variables according to the wheel lateral force estimated in step 1.1 and determining a maximum value of the wheel lateral force of the vehicle based on the range of feasible input variables evaluating values in the range of the feasible input variables and selecting a specific value, in the range of the feasible input variables, as the input amount in accordance with the wheel lateral force of the vehicle estimated in step 1.1, and repeating steps 1.2 and 1.3 to obtain a specific vehicle reachable set in the initial state of the vehicle, wherein the reachable set of the vehicle includes discrete data of the initial state of the vehicle, vehicle wheel lateral force data, vehicle next moment state data and vehicle another moment state data;

step 1.5: determining a range of safe vehicle states according to a maximum value of the transverse vehicle speed, a maximum value of the longitudinal vehicle speed, a maximum value of the yaw velocity, and the initial state of the vehicle; evaluating values in the range of the safe vehicle states and selecting a specific value, in the range of the safe vehicle states, as the initial state of the vehicle, and repeating steps 1.1-1.4 to obtain vehicle reachable sets that includes the specific vehicle reachable set, and storing the vehicle reachable sets in a database without connecting to internet;

wherein step 2 comprises the steps of:
step 2.1: obtaining the initial state of the vehicle with connecting to internet, querying the reachable set of the vehicle based on the initial state of the vehicle, and taking it as a range of an end point of a path planned in a current step;
step 2.2: constructing an artificial potential field distribution of a scene based on a driving environment;
step 2.3: selecting a point with a minimum barrier coefficient obtained based on an artificial potential field method in the reachable set of the vehicle queried in step 2.1, and using the point as an end point of the path planned in the current step at the next moment;
step 2.4: querying a vehicle state at the next moment corresponding to the reachable set of the vehicle according to the end point of the path planned in the current step at the next moment, and taking the vehicle state at the next moment as the initial state of the vehicle of a planned path in a next predicted sample time;
step 2.5: repeating steps 2.1-2.4 until a valid duration of a required future path is equal to a sum of predicted sample times, and completing the path planning.

2. The real-time path planning method taking into account dynamic properties of vehicles of claim 1, wherein estimation of the wheel lateral force of the vehicle satisfies following equations:

$$\alpha_1 = \delta_f - \arctan\left(\frac{v_y + a\dot{\varphi}}{v_x}\right)$$

$$\alpha_2 = \arctan\left(\frac{-v_y + b\dot{\varphi}}{v_x}\right)$$

$$F_{yf} = \mu * m * g * b/(a+b) * \left(\frac{2}{1 + e^{-35\alpha_1}} - 1\right)$$

$$F_{yr} = \mu * m * g * a/(a+b) * \left(\frac{2}{1 + e^{-35\alpha_2}} - 1\right)$$

wherein a represents a front wheelbase distance of the vehicle, wherein b represent a wheelbase distances of the vehicle, wherein m represents a mass of the vehicle, wherein $v_x$ represent the transverse vehicle speed, wherein $v_y$ represent the longitudinal vehicle speed, wherein $\dot{\varphi}$ represents the yaw velocity of the vehicle, wherein g represents a gravitational acceleration, wherein μ represents a ground adhesion coefficient, wherein $\delta_f$ represents a front wheel rotation angle in the current state, wherein $\alpha_1$ and $\alpha_2$ respectively represent front and rear wheel side deflection angles of the vehicle, and wherein $F_{yf}$ and $F_{yr}$ respectively represent front and rear wheel lateral forces of the vehicle.

3. The real-time path planning method taking into account dynamic properties of vehicles of claim 1, wherein the a three-degree-of-freedom vehicle model is used to express the dynamic properties of the vehicle by using a whole state equation as follows:

$$\begin{cases} \dot{v}_x = v_y \dot\varphi + \frac{1}{m} F_{xf} \cos(\delta_f) - \frac{1}{m} F_{yf} \sin(\delta_f) + \frac{1}{m} F_{xr} \\ \dot{v}_y = -v_x \dot\varphi + \frac{1}{m} F_{xf} \sin(\delta_f) + \frac{1}{m} F_{yf} \cos(\delta_f) + \frac{1}{m} F_{yr} \\ \ddot{\varphi} = \frac{L_f}{I_z} (F_{xf} \sin(\delta_f) + F_{yf} \cos(\delta_f)) + \frac{L_r}{I_z} F_{yr} \end{cases}$$

wherein in the aforesaid whole state equation, $F_{yf}$ represents a lateral force of the a front wheel, wherein $F_{yr}$ represents a lateral force of a rear wheel, wherein $P_{xf}$ represents a longitudinal force of the front wheel, wherein $F_{xr}$ represents a longitudinal force of the rear wheel, wherein $v_x$ represents the transverse vehicle speed, wherein $v_y$ represent the longitudinal vehicle speed, wherein $\dot\varphi$ represents a yaw velocity, wherein $\ddot\varphi$ represents the yaw angular acceleration, wherein m represents a mass of the vehicle, wherein $\delta_f$ represents a front wheel rotation angle, wherein $L_f$ represents a distance from a mass center of the vehicle to a front axle, wherein $L_r$ represents a distance from the mass center of the vehicle to a rear axle, and wherein $I_z$ represents a rotational inertia of the vehicle.

4. The real-time path planning method taking into account dynamic properties of vehicles of claim 3, wherein the discretized three-degree-of-freedom vehicle model is obtained by discretizing the three-degree-of-freedom vehicle model using a third-order third-stage Runge-Kutta formula, the discretized three-degree-of-freedom vehicle model is used to predict the vehicle state at the next moment, wherein an input amount of the discretized three-degree-of-freedom vehicle model is defined as an input matrix $u=[F_{yf} F_{yr} F_{xf} F_{xr} \delta_f]$ and a state matrix $x=[v_x v_y \dot\varphi]$, and a calculation formula of a recursive prediction process is as follows:

$$\begin{cases} k_1 = Tf(x, u) \\ k_2 = Tf\left(x + \frac{1}{2}k_1, u\right) \\ k_3 = Tf(x - k_1 + 2k_2, u) \\ x^* = x + \frac{1}{6}(k_1 + 4k_2 + k_3) \end{cases}$$

wherein, T represents a predicted sample time, wherein f represents a replaced symbol of a differential equation of the three-degree-of-freedom vehicle model, wherein $k_1$, $k_2$ and $k_3$ respectively represent intermediate variables in a calculation process, and wherein $x^*= [v_x^* v_y^* \dot\varphi^*]$ represents a predicted vehicle state matrix at the next moment.

5. The real-time path planning method taking into account dynamic properties of vehicles of claim 4, wherein a calculation formula for calculating the position of the vehicle at a next moment based on the initial state of the vehicle and the predicted vehicle state at the next moment is:

$$\begin{cases} \Delta X = \frac{1}{2}(v_x + v_x^*)T \\ \Delta Y = \frac{1}{2}(v_y + v_y^*)T \end{cases}$$

wherein, $\Delta X$ and $\Delta Y$ represent a range where the vehicle is capable of reaching relative to a current position of the vehicle at the next moment.

6. The real-time path planning method taking into account dynamic properties of vehicles of claim 1, wherein a driving range may be divided into three sections, in accordance with a wheel force saturation condition of the vehicle, that are: a normal driving section when a portion of a predicted wheel force at the next moment is lower than 50% of a wheel force saturation value, an emergency driving section when the portion of the predicted wheel force at the next moment is between 50% to 75% of the wheel force saturation value, and a dangerous driving section when the portion of the predicted wheel force at the next moment is greater than 75% of the wheel force saturation value.

7. The real-time path planning method taking into account dynamic properties of vehicles of claim 6, wherein calculation formulas of the wheel force at the next moment and the wheel force saturation value are:

$$F_f^* = \sqrt{\left(F_{xf}^2 + F_{yf}^{*2}\right)}$$

$$F_{max} = \mu m g \frac{L_f}{L_f + L_r}$$

wherein, $F_f^*$ represents the predicted wheel force at the next moment, wherein $F_{xf}$ represents a front wheel longitudinal force, wherein $F_{yf}^*$ represents a predicted front wheel lateral force at the next moment, wherein $F_{max}$ represents the wheel force saturation value, wherein μ represents a ground adhesion coefficient, wherein m represents vehicle, wherein g represents the gravitational acceleration, wherein $L_f$ represents the distance from the mass center of the vehicle to the front axle, and wherein $L_r$ represents the distance from the mass center of the vehicle to the rear axle.

\* \* \* \* \*